A. R. E. PAUL.
FAUCET.
APPLICATION FILED APR. 21, 1911.
1,019,694.
Patented Mar. 5, 1912.
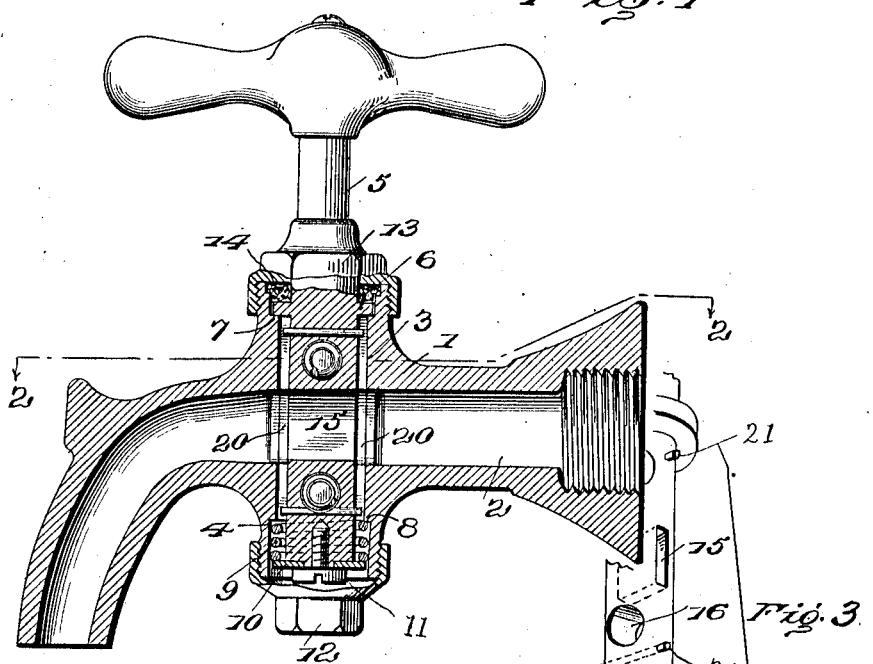
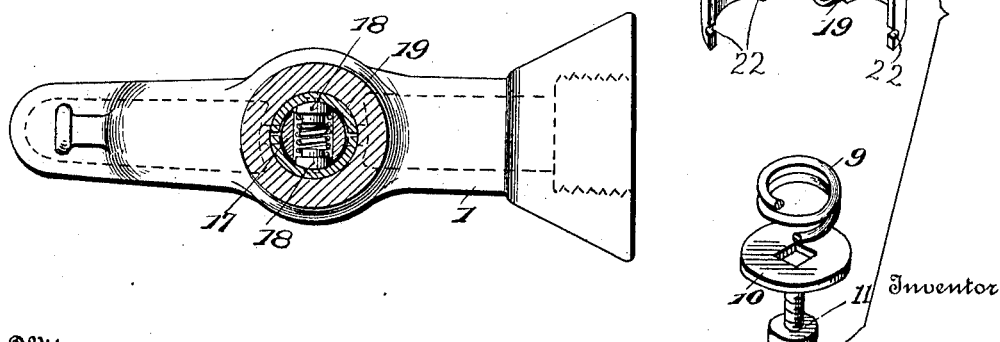

UNITED STATES PATENT OFFICE.

ADOLF R. E. PAUL, OF BROOKLYN, NEW YORK.

FAUCET.

1,019,694.  Specification of Letters Patent.  Patented Mar. 5, 1912.

Application filed April 21, 1911. Serial No. 622,638.

*To all whom it may concern:*

Be it known that I, ADOLF R. E. PAUL, a citizen of the United States, residing at Brooklyn, in the county of Kings and State of New York, have invented certain new and useful Improvements in Faucets, of which the following is a specification.

The present invention relates to faucets and aims primarily to provide against leakage when the faucet is closed. The invention in this connection aims also to obviate the employment of the usual rubber washer which requires to be frequently replaced and does not serve as an effectual leak preventing means.

The invention contemplates the provision of a bushing which is fitted upon the stem of the valve of the faucet and is normally expanded against the wall of the bore in which this stem is rotatably fitted so that leakage, when the valve is in closed position, will be positively prevented.

For a full understanding of the invention reference is to be had to the following description and accompanying drawing, in which:—

Figure 1 is a vertical longitudinal sectional view through a faucet constructed in accordance with the present invention. Fig. 2 is a sectional view therethrough on the line 2—2 of Fig. 1. Fig. 3 is a group view of certain of the parts of the faucet removed.

Corresponding and like parts are referred to in the following description and indicated in all the views of the accompanying drawing by the same reference characters.

In the drawings, the numeral 1 indicates the body of a faucet embodying the present invention and 2 the usual liquid passage therethrough. The body 1 is formed with a bore 3 which intersects the passage 2 and opens at the top of the body and terminates at its lower end in a nipple 4. The valve-stem of the faucet is indicated by the numeral 5 and is formed with a collar 6 which rests upon a shoulder 7 formed in the wall of the bore 3. A similar shoulder 8 is formed near the lower end of the bore and against this latter shoulder bears the upper end of a spring 9 which is fitted upon the stem 5.

The lower end of the spring 9 bears against a washer 10 held upon the stem 5 by means of a screw 11. This spring 9 normally tends to draw the stem 5 downwardly so as to hold its collar 6 firmly against the shoulder 7 and prevent leakage of the liquid around the upper end of the stem. A cap 12 is threaded upon the nipple 4 and serves to close the lower end of the bore. A cap-nut 13 is threaded upon the body 1 in the upper end of the bore 3 and the stem 5 rotatably fits through this nut and a packing 14 arranged therewithin.

The stem 5 is formed with an opening 15 which is arranged to be brought into alinement with the passage 2 to permit of the discharge of liquid through the faucet and above and below this opening 15 the stem is formed with openings 16 which extend at right angles to the opening 15. The bushing employed in connection with the stem consists of two semi-cylindrical sections 17 formed upon their inner surfaces with studs 18 which project into the openings 16 when the sections are properly fitted upon the stem. Springs 19 are arranged one within each of the openings 16 and these springs bear at their ends against the studs 18 and serve to expand the sections of the bushing against the wall of the bore 3. The bushing sections are formed with registering notches 20, in their opposing edges, and these notches register with the opening 15 in the stem so that there is no obstruction to the flow of liquid through the said opening 12. While the studs 18 serve effectually to hold the bushing sections for rotation with the stem, additional means is provided in the nature of studs 21 which project from the opposite sides of the stem adjacent the openings 16 and engage in notches 22 formed in the said edges of the bushing sections. Inasmuch as the springs 19 hold the bushing sections firmly against the wall of the bore in which the stem is mounted, when the stem has been turned to cut off the flow of liquid through the faucet, one or the other of the sections will close the passage 2 at points where it intersects the bore 3. As the bushing sections and the wall of the bore become worn, the sections will be further expanded and will consequently at all times perform their function in an efficient manner.

Having thus described the invention what is claimed as new is:—

In a faucet, a body having a passage extending therethrough, and a bore intersecting the passage, a stem rotatably fitting in the bore and formed with an opening arranged to aline with the passage, a bushing comprising sections fitted about the stem and formed at their opposing edges with notches, the said notches registering, studs projecting from the stem and fitting in the registering notches thereby to hold the sections of the bushing for rotation with the stem, the said sections of the bushing being formed upon their inner sides with studs and the stem being formed with transverse openings receiving the said studs upon the sections of the bushing, the said studs upon the said bushing sections having reduced ends, and springs arranged in the openings in the stem and fitted at their ends over the said reduced ends of the studs, the said springs serving to expand the sections of the bushing against the wall of the bore.

In testimony whereof, I affix my signature in presence of two witnesses.

ADOLF R. E. PAUL. [L. S.]

Witnesses:
GEORGE PETERSON,
CHRISTIAN HOY.

Copies of this patent may be obtained for five cents each, by addressing the "Commissioner of Patents, Washington, D. C."